United States Patent [19]

Yahagi et al.

[11] Patent Number: 4,549,593

[45] Date of Patent: Oct. 29, 1985

[54] PNEUMATIC TIRES

[75] Inventors: Mitsuhisa Yahagi, Sayama; Mikio Masunaga, Kodaira; Shuichi Watanabe, Tokyo; Tsutomu Tanaka, Kodaira, all of Japan

[73] Assignee: Bridgestone Tire Company Limited, Tokyo, Japan

[21] Appl. No.: 564,101

[22] Filed: Dec. 21, 1983

[30] Foreign Application Priority Data

Dec. 28, 1982 [JP] Japan .................................. 57-231029

[51] Int. Cl.⁴ ............................................... B60C 5/14
[52] U.S. Cl. ................................ 152/330 R; 152/374; 152/DIG. 16
[58] Field of Search ................ 152/330 R, 349, 350, 152/374, DIG. 16

[56] References Cited

U.S. PATENT DOCUMENTS

| | | | |
|---|---|---|---|
| 2,541,550 | 2/1951 | Sarbach et al. | 152/DIG. 16 |
| 2,575,249 | 11/1951 | Connell et al. | 152/330 R |
| 2,698,041 | 12/1954 | Morrissey et al. | 152/DIG. 16 |
| 2,992,962 | 7/1961 | Borland et al. | 152/330 R |
| 2,996,095 | 8/1961 | Rowe et al. | 152/330 R |
| 3,038,515 | 6/1962 | Koch et al. | 152/330 R |
| 4,319,619 | 3/1982 | Kozima et al. | 152/DIG. 16 |

FOREIGN PATENT DOCUMENTS 512948 8/1952 Belgium ...................... 152/DIG. 16

Primary Examiner—Lois E. Boland
Attorney, Agent, or Firm—Sughrue, Mion, Zinn, Macpeak and Seas

[57] ABSTRACT

A pneumatic tire is disclosed, which comprises a carcass composed of at least one ply and an inner liner arranged inside the carcass and composed of plural rubber layers. In the tire of this type, the inner liner comprises at least three layers of an outermost layer adjacent to the carcass, an innermost layer facing the inner space of the tire and an intermediate layer interposed between the innermost and outermost layers. The innermost layer is composed of a rubber composition containing 15-60 parts by weight of natural rubber and the balance of a halogenated butyl polymer as a rubber component, while the intermediate layer is composed of a rubber composition containing only a halogenated butyl polymer as a rubber component, which is different from that of the outermost layer in the rubber component.

8 Claims, 2 Drawing Figures

PNEUMATIC TIRES

BACKGROUND OF THE INVENTION (1) Field of the Invention

This invention relates to a pneumatic tire provided with an inner liner having a favorable rubber composition and structure, and more particularly to a heavy duty pneumatic tubeless radial tire for use in trucks, buses and the like.

(2) Description of the Prior Art

In heavy duty pneumatic tubeless radial tire of this type, the inner liner is attached to the inner surface of the tire achieve air-impermeability and generally consists of one or two layers. Particularly, the layer directly contacting with air at the inner surface of the tire is usually composed of a composition containing a polymer such as butyl polymer, halogenated butyl polymer or the like in order to prevent air-permeation and further to prevent the penetration of water when metal cords are particularly employed as a carcass cord.

However, the tires of this type have been recently employed in an application range wider than before in view of improved roads and economical merits. Namely, such tires have been used in a wide range extending from a high-temperature district such as desert district to an extremely cold district, so that unexpected problems have come into existence.

In general, components and materials developed by mainly examining countermeasures to heat build-up have been used in the tires. Therefore, even if an inner liner is applied to the inner surface of the tire, a rubber composition composed mainly of a polymer having good heat properties as well as air- and water-impermeabilities such as halogenated butyl polymer, particularly bromobutyl rubber (Br-IIR) has been selected as a material for the inner linear. But, it has been found that the conventional inner liner of this type produces cracks in an area directly contacting with air or the inner surface when the tire is used in the cold district. This crack grows toward the inside of the tire and eventually brings about the reduction of the internal pressure. Furthermore, the inner liner is extended up to the lower region of each of the bead portions in view of the prevention of air leakage and vulcanized together with the other rubber material such as a bead portion-reinforcing rubber layer directly contacting therewith, but this bead portion-reinforcing rubber layer is composed of a composition mainly containing natural rubber (NR), so that the separation failure is apt to be caused due to the reduction of adhesion betweeen the inner liner and the bead portion-reinforcing rubber layer.

SUMMARY OF THE INVENTION

It is, therefore, an object of the invention to provide pneumatic tires provided with a novel and all-round usable inner liner which can prevent the occurrence of cracks at the inner surface of the inner liner layer even in a wide working temperature range including the extremely cold district without damaging the performance inherent to the conventional tire of this type and further prevent the separation failure between the bead portion-reinforcing rubber layer and the inner liner.

The inventors have made various studies and investigations and found that the above object can be achieved by dividing the inner liner into at least three layers and specifying a rubber composition constituting each layer for the inner liner. That is, according to the invention, there is the provision of a pneumatic tire comprising a carcass composed of at least one ply, and an inner liner disposed in direct contact with the carcass over the substantially whole region of the inner surface thereof and composed of plural rubber layers, characterized in that said inner liner comprises at least three rubber layers of outermost layer adjacent to the carcass, an innermost layer facing the inner space of the tire and an intermediate layer interposed between said outermost and innermost layers, and that said innermost layer is disposed at at least shoulder portions of the tire and composed of a rubber composition containing 15-60 parts by weight of natural rubber and the balance of halogenated butyl polymer as a rubber component, and that said intermediate layer is composed of a rubber composition containing only a halogenated butyl polymer as a rubber component, which is different from that of said outermost layer in the rubber component.

BRIEF DESCRIPTION OF THE DRAWINGS

The invention will now be described in detail with reference to the accompanying drawings, wherein.

DETAILED DESCRIPTION OF THE INVENTION

In the tire according to the invention, the inner liner arranged on the inner surface of the tire is composed of at least three layers, outermost, intermediate and innermost layers. Among them, the outermost layer adjacent to the carcass is preferable to have physical porperties or to be composed of a rubber composition, which being similar to the coating rubber for the carcass by considering the adhesion to the carcass, the influence of the carcass cord upon the adhesion, the displacement on the interface between the layers during the running under a load and the like.

The intermediate layer serves to prevent air-permeation and water penetration causing cord rusting, the reduction of adhesion and the like when metal cords are used for the carcass. For this purpose, the intermediate layer is preferable to be composed of a rubber composition having containing only a halogenated butyl polymer, preferably Br-IIR as a rubber component in view of various properties. However, as mentioned above, when the inner liner for the tire is made from the rubber composition containing only the halogenated butyl polymer, if it directly contacts with air in the extremely cold district ($-20° \sim -60°$ C.), cracks frequently occur in a diagonal direction at the inner surface of the inner liner, particularly in the shoulder portion exhibiting a large deformation during the running under a load. Therefore, when using the intermediate layer composed of such a rubber composition, it is necessary to arrange an innermost layer for preventing the occurrence of cracks on the inner surface of the intermediate layer at at least shoulder portions of the tire. As a matter of course, it is possible to extend the innermost layer from the lower region of one bead portion to the lower region of the other bead portion in view of the workability and the like. Particularly, it is desirable to extend each end of the innermost layer up to a region directly contacting with a bead portion reinforcing rubber layer as mentioned later.

Figure 1:
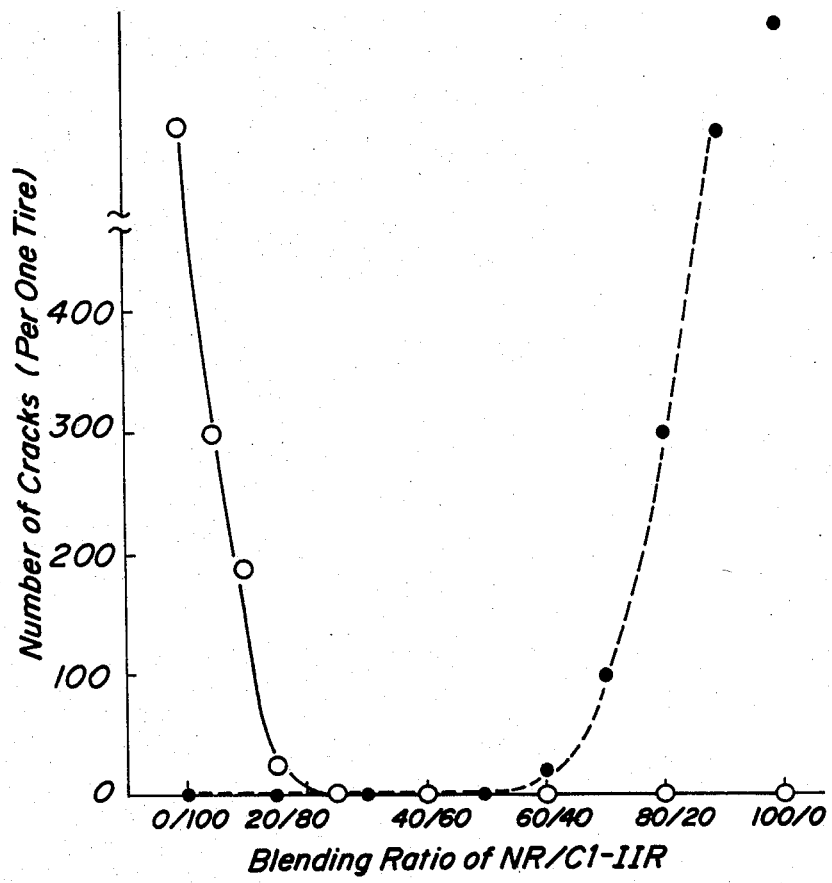
FIG. 1 is a graph showing the relation between the blending ratio of NR and Cl-IIR in the inner liner and the number of cracks produced in a tire.

Since the innermost layer is significant to have a function as a cover rubber layer for the intermediate layer in the sense of preventing the occurrence of cracks at the inner surface of the tire in the extremely cold district, it is desirable to make the innermost layer from a rubber composition producing no crack even in not only the extremely cold district but also high-temperature district. As a result of various investigations, therefore, it has been found that the rubber composition for the innermost layer contains a rubber blend of halogenated butyl polymer and NR, preferably a rubber blend of chlorobutyl rubber (Cl-IIR) and NR as a rubber component, in which NR is desirable to be within a range of 15–60 parts by weight, preferably 25–50 parts by weight per 100 parts by weight of the total rubber content. This will be first explained with reference to FIG. 1, which shows the condition of changing the rubber composition of the innermost layer in the conventional inner liner of two-layer structure. In FIG. 1, an abscissa is the blending ratio of NR to Cl-IIR and an ordinate is the number of cracks produced per one tire, while the solid line is a crack occurrence curve at a low temperature ($-30°$ C.) and the broken lines are a crack occurrence curve at a high temperature ($40°$ C.). In this graph, the marks " " and "o" indicate the number of cracks produced at high and low temperatures, respectively. The occurrence of cracks is observed by keeping the thickness of the innermost layer at 2.0 mm and giving a predetermined radial strain to the inner surface of the innermost layer at the required shoulder portion according to the model test.

As apparent from FIG. 1, when the amount of NR is less than 15 parts by weight, there is caused a problem on the prevention of crack occurrence at the low temperature, while when the amount of NR exceeds 60 parts by weight, there is caused a problem on the prevention of crack occurrence at the high temperature and further there are another problems such as the reduction of adhesion to the intermediate layer and the like.

The invention will be described with reference to the following examples which are given to be illustrative of the invention but not to be limitation thereof.

Figure 2:
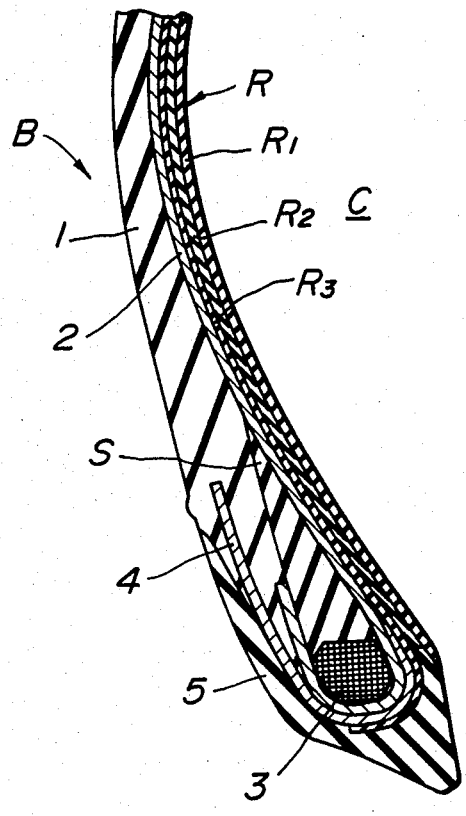
FIG. 2 is a sectional view of an embodiment of the pneumatic tire according to the invention at a lower region of a left-hand sidewall portion.

The pneumatic tire to be used in the invention has a size of 11R 22.5 and is the same structure as the conventional heavy duty pneumatic tubeless radial tire of this type except the lower region of the sidewall portion and the inner liner. In FIG. 2 is shown a radial section of the lower region B of the sidewall portion inclusive of the bead portion in the tire according to the invention.

Numeral 1 is a sidewall rubber as generally used. A carcass 2 is a single ply of steel cords arranged in the radial direction of the tire or at 90° with respect to the circumferential direction of the tire, and is turned around a bead core 3 from the inside to the outside to sandwich a usual stiffener S in the conventional manner. A reinforcing layer 4 composed of steel cords is arranged outside the turnup portion of the carcass ply 2 so as to surround this portion, while a bead portion reinforcing rubber layer 5 is disposed outside the reinforcing layer 4. The rubber layer 5 is composed of a rubber composition mainly containing NR with a high hardness in view of the resistance to rim-chafing and the like. On the inner surface of the tire is disposed an inner liner R which is an essential point of the invention. As shown in FIG. 2, the inner liner R is composed of an innermost layer $R_1$, an intermediate layer $R_2$ and an outermost layer $R_3$ viewing from an internal space C of the tire. These layers $R_1$, $R_2$ and $R_3$ are designed to have thicknesses of 1.5 mm, 0.8 mm and 0.7 mm, respectively, as measured at the shoulder portion of the tire. All of these layers extend up to the lower region of the bead portion. In particular, the innermost layer $R_1$ is brought into direct contact with the bead portion-reinforcing rubber layer 5 and secured thereto through vulcanization. In the inner liner R, it is preferable that the modulus of elasticity becomes smaller in the order of the outermost layer $R_3 \rightarrow$ innermost layer $R_1 \rightarrow$ intermediate layer $R_2$.

The detail of the inner liner to be used in the following test is shown in the following Table 1. Moreover, the thickness and arrangement of the inner liner R and the other components in the test tire are the same as mentioned above. After the test tire was actually run over a distance of 100,000 km, the occurrence of cracks in the inner surface of the tire was observed at a specified testing district to obtain a result as shown in Table 1. Further, the compounding recipe of the rubber composition shown in Table 1 is shown in the following Table 2.

TABLE 1

|   |   | Rubber composition in inner liner R | | | Occurrence of cracks in inner liner | |
|---|---|---|---|---|---|---|
| Tire No. |   | Outermost layer $R_3$ | Intermediate layer $R_2$ | Innermost layer $R_1$ | Extremely high-temperature district | Extremely cold District |
| 1 | Comparative tire | A | B | — | none | appeared |
| 2 | Comparative tire | " | " | $C_1$ | " | " |
| 3 | Comparative tire | " | " | $C_2$ | appeared | none |
| 4 | Invention tire | " | " | $C_3$ | none | " |
| 5 | Invention tire | " | " | $C_4$ | " | " |
| 6 | Invention tire | " | " | $C_5$ | " | " |

TABLE 2

| Compounding recipe | Rubber composition | | | | | | |
|---|---|---|---|---|---|---|---|
|   | A | B | $C_1$ | $C_2$ | $C_3$ | $C_4$ | $C_5$ |
| NR | 100 | — | 5 | 80 | 30 | 30 | 40 |
| Br—IIR | — | 100 | — | — | — | 70 | — |
| Cl—IIR | — | — | 95 | 20 | 70 | — | 60 |
| Carbon black HAF | 50 | — | — | — | — | — | — |
| Carbon black GPF | — | 60 | 60 | 60 | 60 | 60 | 60 |
| Aromatic oil | 2 | 5 | 5 | 5 | 5 | 5 | 5 |
| Stearic acid | 2 | 2 | 2 | 2 | 2 | 2 | 2 |
| Antioxidant*1 | 0.5 | — | — | — | — | — | — |
| ZnO | 5 | 5 | 5 | 5 | 5 | 5 | 5 |
| Vulcanization accelerator Nobs*2 | 0.8 | — | 0.1 | 0.8 | 0.2 | 0.2 | 0.2 |
| Vulcanization accelerator TT*3 | — | 0.5 | 0.5 | 0.1 | 0.5 | 0.5 | 0.5 |
| Sulfur | 3 | 1 | 1 | 1 | 1 | 1 | 1 |
| ECR 1102*4 | — | 2 | 2 | 1 | 2 | 2 | 2 |

*1 N—phenyl-N'—isopropyl-p-phenylenediamine (IPPD)
*2 N—oxydiethylene-2-benzothiazolylsulphenamide (tradename: Nocceler-MSA.F, made by Ohuchi Shinko Kagaku K.K.)
*3 Tetramethylthiuram disulfide (tradename: Nocceler-DM, made by Ohuchi Shinko Kagaku K.K.)
*4 Petrolium resin (tradename, made by Exxon Chemical Corp.)

As apparent from the above results, the three-layer structure of the inner liner according to the invention can effectively prevent the occurrence of cracks in the inner surface of the inner liner adversely affecting the important performances of the tires at both the extremely high-temperature and extremely cold districts.

Preferably, the invention is applied to heavy duty pneumatic tubeless radial tires.

What is claimed is:

1. A pneumatic tire comprising a carcass composed of at least one ply, and an inner liner disposed in direct contact with said carcass over the substantially whole region of the inner surface thereof and composed of plural rubber layers, characterized in that said inner liner comprises at least three rubber layers including an outermost layer adjacent to the carcass, an innermost layer facing the inner space of the tire, and an intermediate layer interposed between said outermost and innermost layers, and that said innermost layer is disposed at at least shoulder portions of the tire and composed of a rubber composition containing 15–60 parts by weight of natural rubber and the balance of a halogenated butyl polymer as a rubber component, and that said intermediate layer is composed of a rubber composition containing only a halogenated butyl polymer as a rubber component, which is different from that of said outermost layer in the rubber component.

2. A pneumatic tire according to claim 1, wherein said innermost layer is extended from a lower region of one bead portion to a lower region of the other bead portion.

3. A pneumatic tire according to claim 1, wherein at least a part of said innermost layer is brought into direct contact with a bead portion reinforcing rubber layer arranged on a lower region of each bead portion.

4. A pneumatic tire according to claim 1, wherein said outermost layer is composed of a rubber composition having substantially the same physical properties as a coating rubber for the carcass.

5. A pneumatic tire according to claim 1, wherein said rubber composition of the innermost layer contains 25–50 parts by weight of natural rubber.

6. A pneumatic tire according to claim 1, wherein said halogenated butyl rubber in the rubber composition for said innermost layer is chlorobutyl rubber.

7. A pneumatic tire according to claim 1, wherein said halogenated butyl rubber in the rubber composition for said intermediate layer is bromobutyl rubber.

8. A pneumatic tire according to claim 1, wherein the modulus of elasticity decreases in the order of said outermost layer, innermost layer and intermediate layer.

* * * * *